H. H. LUCAS.
COVER FOR SYRUP CUPS OR OTHER VESSELS.
APPLICATION FILED NOV. 6, 1911.
1,045,993.
Patented Dec. 3, 1912.
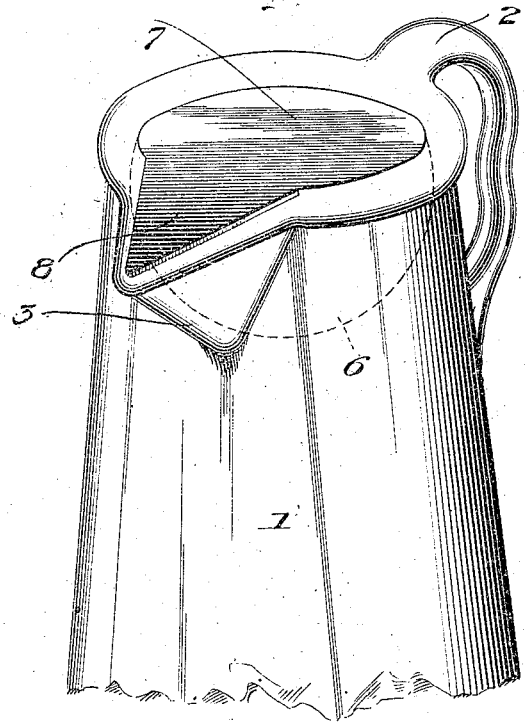
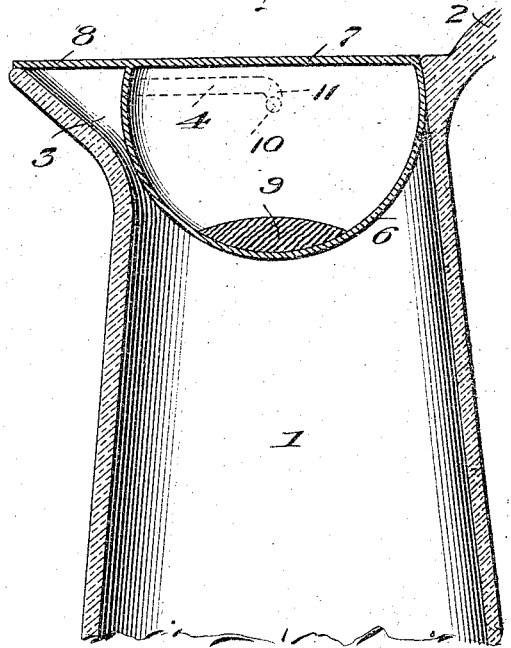
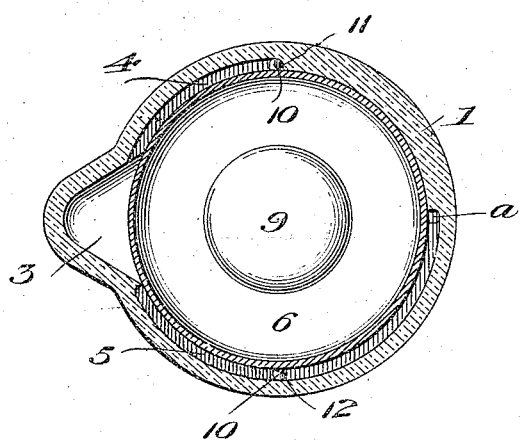
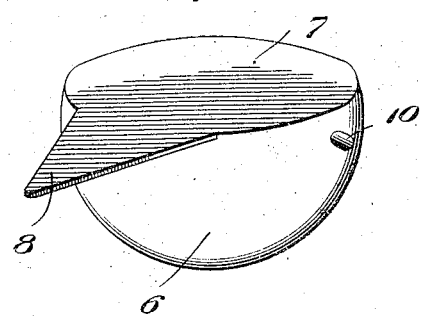
WITNESSES
INVENTOR
Henry H. Lucas
by Henry N. Copp
his Attorney

UNITED STATES PATENT OFFICE.

HENRY HERBERT LUCAS, OF PHOENIX, ARIZONA.

COVER FOR SYRUP-CUPS OR OTHER VESSELS.

1,045,993.     Specification of Letters Patent.     Patented Dec. 3, 1912.

Application filed November 6, 1911. Serial No. 658,911.

*To all whom it may concern:*

Be it known that I, HENRY H. LUCAS, a citizen of the United States, residing at Phoenix, county of Maricopa, State of Arizona, have invented certain new and useful Improvements in Covers for Syrup-Cups or other Vessels, of which the following is a specification.

This invention relates to covers for syrup cups or other vessels.

The object of the invention is to dispense with the use of springs and similar devices for closing the cover or lid and to provide a novel self-opening and closing cover which will not become accidentally detached and will at all times keep the pitcher, syrup cup or other vessel closed when it is in usual standing position, but will uncover the vessel when the latter is tilted so that the contents may be poured off as may be desired and yet, when the vessel is again restored to standing position, the cover will automatically close it.

The invention consists of a pivoted cover of novel form and construction and, further, one which is provided with a new interlocking, detachable, pivotal connection with the syrup cup, pitcher or vessel, as will more fully appear hereinafter.

In the accompanying drawings: Figure 1 is a perspective view showing the cover applied to a pitcher or syrup cup and in closed position; Fig. 2, a vertical section; Fig. 3, a horizontal section showing the connection between the cover and the vessel; and Fig. 4, a detail perspective of the cover.

The present invention is adaptable for use on pitchers, syrup cups and vessels of any kind. It is as well adapted for use on cooking utensils such as pots, kettles and the like as on pitchers and syrup cups.

The invention is shown in the drawings as applied to a pitcher or syrup cup 1 having the usual handle 2 and spout or nose 3.

In the vessel 1 near the top and at the interior thereof, there are provided grooves or channels 4 and 5 which preferably intercept the opening in the pouring nose or spout 3. These grooves or channels being closed at their upper margins, prevent accidental detachment of the cover as will presently appear.

The cover has a substantially semi-spherical part 6 and a top 7 provided with a lip 8 which is adapted to cover the opening in the spout or nose 3. Preferably, for the sake of lightness, the body 6, top 7 and lip 8 are made of sheet metal. Any suitable means for weighting the cover may be provided on any part thereof to adapt it to maintain a substantially horizontal position so that it will close the vessel when the latter is in standing position and when the vessel is tilted, will not interfere with the free outflow of the contents thereof through the nose or spout 3. A convenient weighting device may consist of a small weight 9 of lead or solder secured at the bottom of the cover 6 inside the latter, but I wish it understood that I do not limit myself to this particular means of weighting the cover and the latter may be so balanced in any preferred manner that it will always remain in horizontal position. The cover is provided with trunnions or pivots 10 projecting from the sides of the body which are adapted to be entered in the grooves or slots 4 and 5 and to lie in the downwardly offset bearing parts 11 and 12 thereof.

The grooves 4 and 5 may continue the entire internal circumference of the vessel, but this is not necessary. The groove 5 is considerably longer than the groove 4 so that the trunnion 10 at that side may first be inserted in the groove 5 and turned to the dotted position *a* which will enable the other trunnion 10 to be passed down into the spout 3 and inserted in the groove 4, whereupon a reverse turning of the cover will bring the trunnions as shown in Fig. 3 and they will then lie in the depressed bearing parts 11 and 12. The cover is thus rendered easily detachable and attachable for purposes of cleaning at any time.

The present invention is not limited for use in connection with vessels having a lip or spout, nor is it limited to the use of grooves intersecting a spout; the grooves may originate and terminate differently from what is shown in the drawings and the entrances to the grooves may be vertical branches thereof; furthermore, the length of the groove 5 need not be as great as shown in the drawings. These and all other modifications falling within the spirit and scope of the invention are laid claim to.

Having thus described my invention, what I claim as new and desire to secure by Letters Patent, is:—

1. The combination with a vessel having grooves in its inner surface provided with walls at both top and bottom, of a cover having pivots or trunnions pivotally seated in the grooves and held by the walls of said grooves against accidental detachment upwardly or downwardly, said trunnions pivotally connecting the cover to the vessel and the cover being free to swing when connected to the vessel.

2. The combination with a vessel having grooves disposed in general horizontal position in the inner wall thereof, said grooves being provided with walls at both top and bottom, of a cover provided with pivots pivotally seated in said grooves and held by the walls of said grooves against accidental detachment upwardly or, the grooves having open parts adapted for the entry of the pivots therein, said pivots pivotally connecting the cover to the vessel and the cover being free to swing when connected to the vessel.

In testimony whereof, I hereunto affix my signature in presence of two witnesses.

HENRY HERBERT LUCAS.

Witnesses:
J. H. KINNEY,
J. L. MORSE.

Copies of this patent may be obtained for five cents each, by addressing the "Commissioner of Patents, Washington, D. C."